July 27, 1954    G. HOHWART ET AL    2,684,854
BUBBLE CONSTRUCTION FOR EXPANSION CHUCKS
Filed Feb. 23, 1952
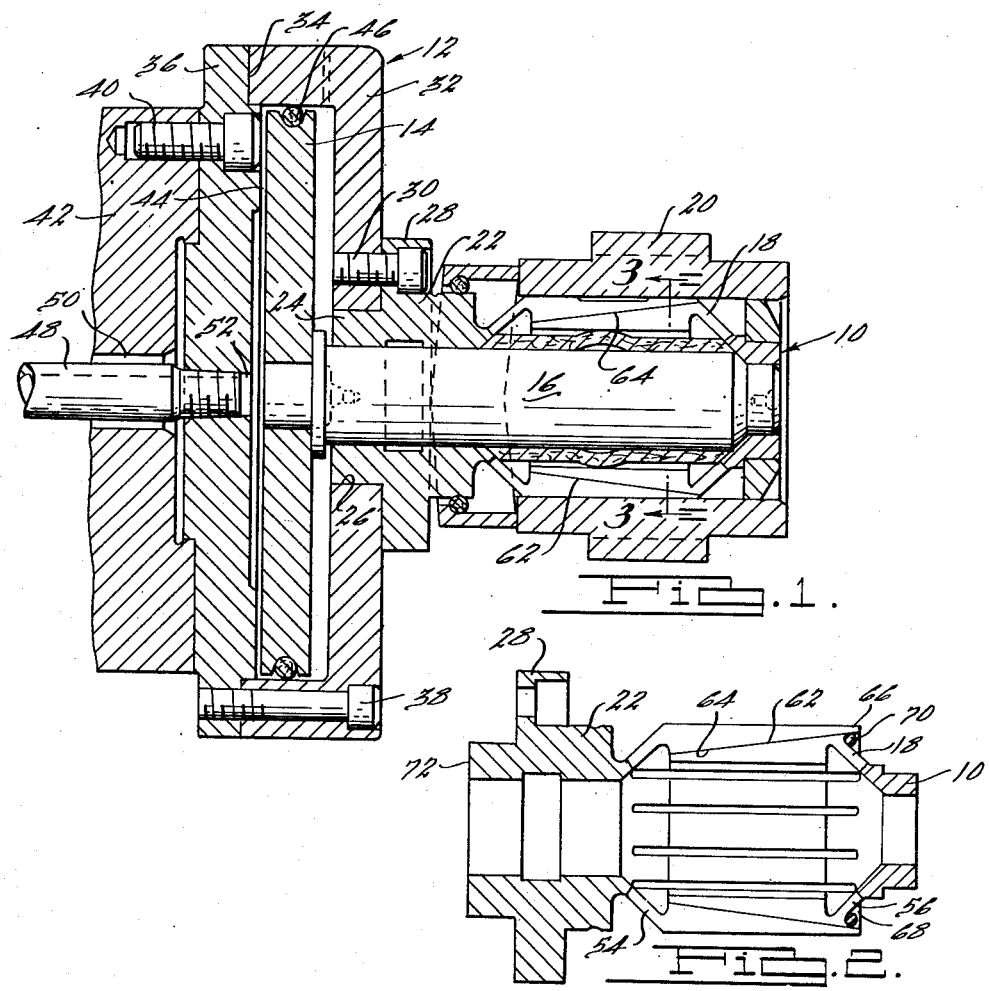
Fig. 1.
Fig. 2.
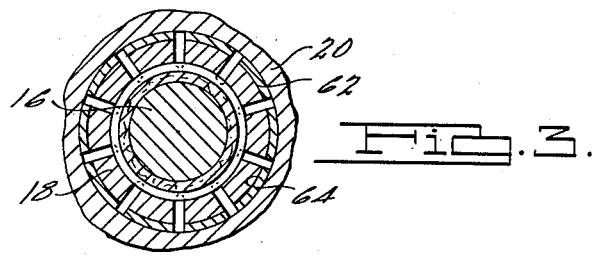
Fig. 3.
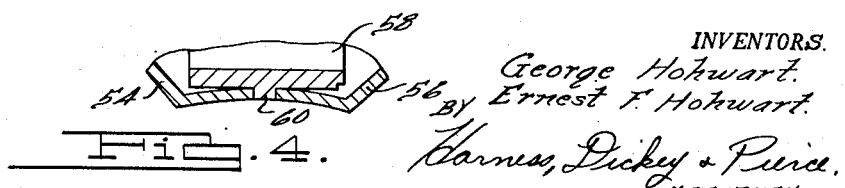
Fig. 4.
INVENTORS.
George Hohwart.
Ernest F. Hohwart.
BY Harness, Dickey & Pierce.
ATTORNEYS.

Patented July 27, 1954

2,684,854

UNITED STATES PATENT OFFICE 2,684,854

BUBBLE CONSTRUCTION FOR EXPANSION CHUCKS

George Hohwart, Farmington Township, Oakland County, and Ernest Frederick Hohwart, Detroit, Mich., assignors to N. A. Woodworth Company, Ferndale, Mich., a corporation of Michigan Application February 23, 1952, Serial No. 273,107

4 Claims. (Cl. 279—2)

This invention relates broadly to new and useful improvements in chucking devices.

An important object of the present invention is to provide an improved manufacture for chucks of the type disclosed in our copending application Serial No. 119,192, filed October 1, 1949, now Patent No. 2,626,811.

Other objects and advantages of the invention will be apparent during the course of the following description.

In the drawing forming a part of this specification and wherein like numerals are employed to designate like parts throughout the same, Fig. 1 is a longitudinal sectional view showing a chuck embodying the instant invention mounted on an operating cylinder and operatively associated with a workpiece, Fig. 2 is a view similar to Fig. 1 but showing the chuck separate from the operating cylinder and the workpiece and illustrating an intermediate step in the manufacture of the chuck, Fig. 3 is a fragmentary transverse sectional view taken on the line 3—3 of Fig. 1, and Fig. 4 is a fragmentary longitudinal sectional view illustrating a critical defect in the prior construction that has been corrected by the instant invention.

As suggested, the invention is concerned primarily with a chuck or arbor of the type disclosed in the copending application referred to above. This chuck is generally tubular in form and has one or more longitudinally arched clamping sections or "bubbles" which expand or contract to clamp a workpiece when the chuck is stressed axially. If the work is to be clamped on the outside of the chuck the clamping sections are arched outwardly; but on the other hand, if the work is to be inserted into the chuck the clamping sections are arched inwardly. Preferably, the clamping bubble or bubbles engage the work when the chuck is relaxed or unstressed. Thus, in use, the chuck is placed under tension to contract the bubbles sufficiently so that the work can be moved either over or through the bubbles as the case may be. Then when the chuck is released, the bubbles expand into clamping engagement with the work.

It is believed that the above construction can best be illustrated by referring to Fig. 1 of the drawing which shows a tubular chuck 10 embodying the invention attached to the forward end of a cylinder 12 in which a piston 14 is reciprocally mounted. The piston 14 is power-actuated forwardly in the cylinder 12 in any suitable manner, and as it advances it pushes against a pin 16 between the piston and the distal end of the chuck 10. Thus, the piston pushes against the pin 16 to stretch the chuck 10, and as the chuck stretches it reduces the diameter of the bubble section 18 sufficiently so that a workpiece 20 can be slipped onto the chuck as shown in the drawing. When power against the piston 14 is released, the inherent resiliency of the chuck 10 causes it to assume its former position and the bubble section 18 to expand against and tightly clamp the workpiece 20.

With the above general introduction, it will be observed that the particular chuck 10 here shown has a relatively heavy base portion 22 at one end thereof which is adapted for attachment to the cylinder 12. The chuck 10 is properly centered with respect to the cylinder by the inner terminal 24 of the base portion 22, which terminal extends into and snugly fits a central opening 26 in the cylinder 12. A radial flange 28 on the base portion 22 overlies the cylinder 12 around the opening 26 and is securely but detachably fastened to the cylinder by screws 30.

The cylinder 12 here shown comprises a generally cup-shaped member 32 which is piloted in an annular groove 34 provided in a base plate 36. Screws 38 detachably fasten the cup-shaped member 32 to the base plate 36. Screws 40 in turn fasten the base plate 36 to a spindle 42 or the like.

The piston 14 is free-floating in the chamber 44 of the cylinder 12, and the space between the periphery of the piston and the inner annular wall of the cylinder is sealed by an O ring 46. Any suitable means may be used for driving the piston 14 forwardly in the cylinder 12, and by way of illustration, apparatus which is pneumatically operated is here shown. To this end we have shown an air pipe 48 extending through a longitudinal passage 50 in the spindle 42 and threaded into an opening 52 in the backing plate 36. The pipe 48 extends from any suitable source of air under pressure and delivers the air into the cylinder chamber 44 behind piston 14. Air pressure in the chamber 44 acting against the piston 14 drives the latter forwardly against the pin 16 to operate the chuck 10 in the manner hereinabove described.

Heretofore the bubble section 18 of the chuck 10 has been formed in two parts 54 and 56 as shown in Fig. 4, and the two parts have been joined by an inner, relatively thick ring 58. The usual practice has been to form the ring 58 with a centrally disposed outwardly extending rib 60 which extends between the two sections 54 and 56 and terminates flush with the outer surfaces thereof. When the chuck is made, the ring 58 fits snugly within the two bubble sections 54 and 56, and after the parts are assembled as shown in Fig. 4, the inner ring 58 is copper-welded to the sections 54 and 56 to form an integral one-piece construction.

The above construction has been generally satisfactory but is relatively short-lived. More particularly, it is subject to the disadvantage that when the chuck is stressed longitudinally to reduce the diameter of the bubble section 18 sufficiently to receive the work 20, the two parts 54 and 56 of the bubble tend to assume the positions shown in Fig. 4. This creates excessive stresses in the copper-weld joint between the parts 54 and 56 and the ring 58 so that repeated flexure of the chuck 10 ruptures the copper-weld material. When this occurs, the parts come apart or, alternatively, the copper-weld joint merely fractures sufficiently so that the chuck becomes faulty in operation.

We have now discovered that if the bubble section 18 of the chuck 10 is made as shown in Fig. 2 the above difficulties are obviated. Specifically, the bubble part 56 is made with a frusto-conical outer surface 62, which surface tapers toward the end of the part, and the part 54 is made with a similar frusto-conical inner surface 64 which tapers away from the end of the part. The tapered terminal portion of the part 56 fits snugly in the correspondingly inwardly tapered terminal portion of the part 54, and the two surfaces 62 and 64 exactly coincide as shown in the drawing.

It will be observed that this construction provides a tapered interface between the parts 54 and 56 and that this interface extends obliquely in a straight line from substantially the outer surface to substantially the inner surface of the bubble 18. The parts preferably are copper-welded together in order to units the two sections 54 and 56 and in order to provide for the necessary unitary construction.

The outer section 54 is constructed initially to extend beyond the engaged surface of the inner section 56 as perhaps best shown in Fig. 2. The extending portion 66 provides a trough 68 which receives a copper weld wire 70. The chuck 10 is then placed on the end 72 thereof in a suitable furnace and heated to a temperature which causes the copper weld wire 70 to melt and flow downwardly along the interface 62—64. The copper-weld thus formed effectively unites the two parts 54 and 56 to form an integral one-piece construction. After the copper welding operation, the projecting portion 66 is cut off and the bubble is reduced to the desired final size and form to provide a finished construction, as shown in Fig. 1.

When the parts 54 and 56 are constructed and joined together in the manner thus described, the life of the chuck is greatly increased. We have found that a chuck constructed in this manner can be flexed many, many times without danger of a ruptured or fractured joint between the parts of the bubble. It will be observed that the relatively thin feather edge of each part 54 and 56 is disposed adjacent to a relatively heavy or thick portion of the adjacent part. Apparently when the chuck is flexed in use the relatively thin feather edge of each section follows easily and conforms readily to the stressed shape of the chuck and any tendency for the individual sections to resist flexure and fracture the copper-weld joint which unites them is substantially eliminated. In any event, actual tests have shown that the instant construction extends the life of the chuck many fold.

In this connection it will be readily appreciated that the expression "feather edge" does not mean that the taper ends of the parts 54 and 56 must come to a thin knife edge. This expression is intended to include thin taper ends of the type shown in the drawing but not necessarily sharp taper ends. The important thing in so far as the instant invention is concerned is that the taper construction reduce the resistance offered by the taper ends of the parts 54 and 56 sufficiently so that they flex readily with the arbor section of the chuck. When this result is accomplished, the taper ends of the parts offer no appreciable or significant resistance to flexure of the chuck and minimize possibility of rupturing the diagonal joint defined by surfaces 62 and 64.

Having thus described the invention, we claim:

1. A chuck arbor comprising a tubular section having a longitudinally arched, radially expansible portion having a plurality of longitudinal through slots spaced circumferentially therearound, the latter being formed from two interfitting parts and said parts being separated by a frusto-conical interface which extends obliquely from the outside surfaces to the inside surfaces of said parts and defines a relatively thin feather edge on each of said parts, and means integrally uniting the parts at said interface.

2. A chuck arbor comprising a tubular section having a longitudinally arched radially expansible portion having a plurality of longitudinal through slots spaced circumferentially therearound, the latter being formed from two interfitting parts and said parts being separated by a frusto-conical interface extending obliquely from the outside surfaces to the inside surfaces of said parts and defining a relatively thin feather edge on each of said parts, and copper-weld material along the interface between said parts bonded to and integrally uniting said parts.

3. A chuck arbor comprising a tubular section having a longitudinally arched radially expansible portion having a plurality of longitudinal through slots spaced circumferentially therearound, the latter being formed in two parts, one part having an external conical surface extending from one end thereof and the other part having an internal conical surface extending from one end thereof, the conical surfaces of said parts defining an essentially thin feather edge on each of said parts and the conical surfaces of each part flatly engaging the conical surface on the other of said parts, and means integrally uniting the mentioned conical surfaces of said parts.

4. A chuck arbor comprising a tubular section having a longitudinally arched, radially flexible portion having a plurality of longitudinal through slots spaced circumferentially therearound, said flexible portion being formed of two parts having relatively long overlapping tapered portions defining a diagonal interface extending between the inner and outer surfaces of said section, and metal in the joint between said tapered portions integrally uniting said parts, the taper end of each of said tapered portions engaging and being relatively thin with respect to the adjacent part of the other of said portions and flexing readily therewith in use so as to minimize resistance of said taper ends to flexure of said chuck and consequently to rupture of the brazed joint between said parts.

References Cited in the file of this patent

UNITED STATES PATENTS

| Number | Name | Date |
| --- | --- | --- |
| 2,177,979 | Davis | Oct. 31, 1939 |